(12) United States Patent
Shishido

(10) Patent No.: US 11,512,945 B2
(45) Date of Patent: Nov. 29, 2022

(54) CONTROL METHOD FOR PROJECTOR AND PROJECTOR

(71) Applicant: SEIKO EPSON CORPORATION, Tokyo (JP)

(72) Inventor: Yoichi Shishido, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 46 days.

(21) Appl. No.: 16/938,028

(22) Filed: Jul. 24, 2020

(65) Prior Publication Data

US 2021/0025699 A1   Jan. 28, 2021

(30) Foreign Application Priority Data

Jul. 26, 2019   (JP) .............................. JP2019-137616

(51) Int. Cl.
  *G01B 11/25* (2006.01)
  *H04N 9/31* (2006.01)

(52) U.S. Cl.
  CPC ........ *G01B 11/2513* (2013.01); *G01B 11/254* (2013.01); *H04N 9/3147* (2013.01); *H04N 9/3179* (2013.01)

(58) Field of Classification Search
  CPC .......................... G01B 11/2513; G01B 11/254; H04N 9/3147; H04N 9/3179
  USPC ....................................................... 348/734
  See application file for complete search history.

(56) References Cited

U.S. PATENT DOCUMENTS

| | | | |
|---|---|---|---|
| 9,091,536 B2 * | 7/2015 | Hausler | G01B 11/2522 |
| 10,284,831 B2 * | 5/2019 | Tanaka | H04N 9/3185 |
| 2007/0291233 A1 * | 12/2007 | Culbertson | H04N 9/3194 |
| | | | 353/34 |
| 2010/0303341 A1 * | 12/2010 | Hausler | G01B 11/2513 |
| | | | 382/154 |
| 2012/0069180 A1 * | 3/2012 | Kawamura | H04N 9/3179 |
| | | | 348/143 |

(Continued)

FOREIGN PATENT DOCUMENTS

| | | |
|---|---|---|
| EP | 0157299 A1 | 10/1985 |
| JP | S60-200111 A | 10/1985 |

(Continued)

*Primary Examiner* — John W Miller
*Assistant Examiner* — Sean N. Haiem
(74) *Attorney, Agent, or Firm* — Oliff PLC

(57) ABSTRACT

A projector projects a first image onto a projection surface to thereby display a first projected image on the projection surface, acquires first imaging data obtained by capturing the first projected image, determines, based on the first imaging data, a type of a three-dimensional shape on the projection surface, projects a second image including a plurality of points onto the projection surface to thereby display a second projected image on the projection surface, acquires second imaging data obtained by capturing the second projected image, specifies, based on the second imaging data and the type of the three-dimensional shape on the projection surface, positions of the respective plurality of points on the projection surface, generates, based on the positions of the respective plurality of points, and correction data for correcting distortion of an image projected onto the projection surface, corrects, based on the correction data, image data input to the projector.

9 Claims, 14 Drawing Sheets

(56) References Cited

U.S. PATENT DOCUMENTS

| | | | |
|---|---|---|---|
| 2013/0293684 A1* | 11/2013 | Becker | G01S 7/491 |
| | | | 348/47 |
| 2014/0002610 A1* | 1/2014 | Xi | G01B 11/2545 |
| | | | 348/46 |
| 2014/0268093 A1* | 9/2014 | Tohme | G01S 17/48 |
| | | | 356/3.08 |
| 2015/0204662 A1* | 7/2015 | Kobayashi et al. | G01B 11/25 |
| | | | 356/610 |
| 2016/0073104 A1* | 3/2016 | Hillebrand | G01B 11/245 |
| | | | 348/47 |
| 2017/0347076 A1* | 11/2017 | Fuchikami et al. | G06T 7/60 |
| 2018/0007329 A1* | 1/2018 | Tanaka | G09G 3/001 |
| 2018/0101246 A1* | 4/2018 | Moussakhani | G06F 3/0325 |

FOREIGN PATENT DOCUMENTS

| | | |
|---|---|---|
| JP | 2007-322259 A | 12/2007 |
| JP | 2011-257622 A | 12/2011 |

* cited by examiner

CONTROL METHOD FOR PROJECTOR AND PROJECTOR

The present application is based on, and claims priority from JP Application Serial Number 2019-137616, filed Jul. 26, 2019, the disclosure of which is hereby incorporated by reference herein in its entirety.

BACKGROUND

1. Technical Field

The present disclosure relates to a control method for a projector and the projector.

2. Related Art

There has been disclosed a technique for, even when a projection surface is, for example, a curved surface and is not a plane, in order to project an image without distortion, correcting an image projected by a projector to offset distortion in the image. For example, JP-A-2011-257622 (Patent Literature 1) discloses a projector that projects an image for correction including a plurality of lattice points onto a projection surface, captures the image for correction displayed on the projection surface, acquires imaging data, species positions of the respective plurality of lattice points from the imaging data, and generates correction data from differences between the specified positions of the respective plurality of lattice points and original positions of the respective plurality of lattice points.

However, in the related art described above, measurement errors are included in the positions of the respective plurality of lattice points specified from the imaging data. Therefore, an image projected onto the projection surface is sometimes distorted.

SUMMARY

A control method for a projector according to a preferred aspect of the present disclosure includes: projecting a first image onto a projection surface to thereby display a first projected image on the projection surface; acquiring first imaging data obtained by capturing the first projected image; determining, based on the first imaging data, a type of a three-dimensional shape on the projection surface; projecting a second image including a plurality of points onto the projection surface to thereby display a second projected image on the projection surface; acquiring second imaging data obtained by capturing the second projected image; specifying, based on the second imaging data and the type of the three-dimensional shape on the projection surface, positions of the respective plurality of points on the projection surface; generating, based on the positions of the respective plurality of points, correction data for correcting distortion of an image projected onto the projection surface; correcting, based on the correction data, image data input to the projector; and projecting, onto the projection surface, a corrected image based on corrected image data obtained by correcting the image data.

A projector according to a preferred aspect of the present disclosure includes: a projecting section configured to project an image onto a projection surface; an acquiring section configured to acquire imaging data obtained by capturing the image projected onto the projection surface; a determining section configured to determine a type of a three-dimensional shape on the projection surface; a specifying section configured to specify positions of a respective plurality of points projected onto the projection surface; a generating section configured to generate correction data for correcting distortion of the image projected onto the projection surface; and a correcting section configured to correct image data input to the projector. The projecting section projects a first image onto the projection surface to thereby display a first projected image on the projection surface, the acquiring section acquires first imaging data obtained by capturing the first projected image, the determining section determines, based on the first imaging data, a type of the three-dimensional shape on the projection surface, the projecting section projects a second image indicating a plurality of points onto the projection surface to thereby display a second projected image on the projection surface; the acquiring section acquires second imaging data obtained by capturing the second projected image, the specifying section specifies, based on the second imaging data and the type of the three-dimensional shape on the projection surface, positions of the respective plurality of points on the projection surface, the generating section generates the correction data based on the positions of the respective plurality of points, the correcting section corrects the input image data based on the correction data, and the projecting section projects, onto the projection surface, a corrected image based on corrected image data obtained by correcting the image data.

DESCRIPTION OF EXEMPLARY EMBODIMENTS

Figure 1:
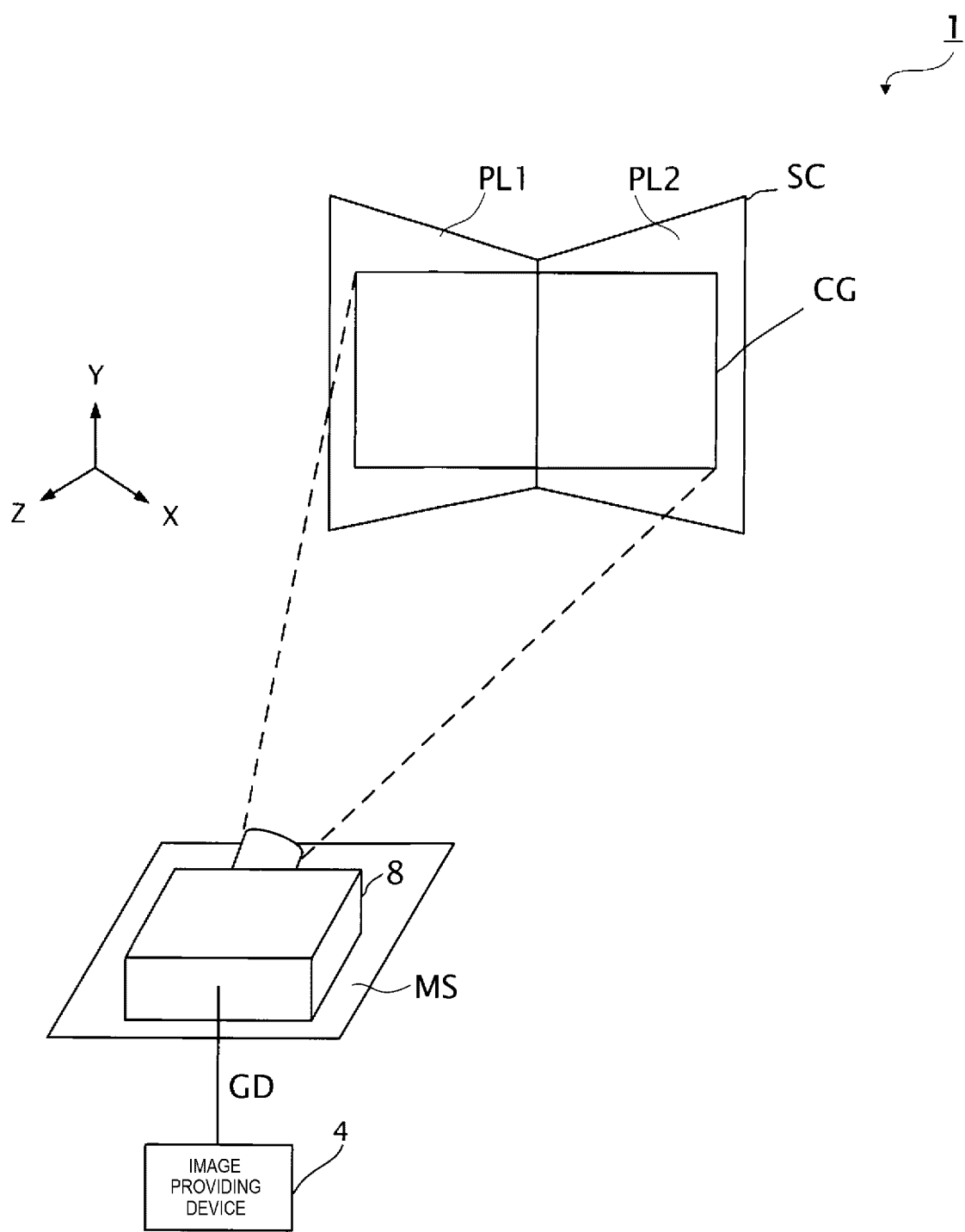
FIG. 1 is a diagram showing a projection system.

Modes for carrying out the present disclosure are explained below with reference to the drawings. In the drawings, dimensions and scales of sections are differentiated from actual ones as appropriate. Since embodiments explained below are preferred specific examples of the present disclosure, technically preferable various limitations are applied to the embodiments. However, the scope of the present disclosure is not limited to these embodiments unless specifically described in the following explanation that the present disclosure is limited.

A. First Embodiment

A projector 8 according to a first embodiment is explained.

A. 1. Overview of a Projection System 1

A projection system 1 is shown in FIG. 1. The projection system 1 includes an image providing device 4 and the projector 8. The image providing device 4 is, for example, a cellular phone, a PC, a DVD player, a game device, or a portable information storage medium such as a USB memory or a PC card. In this embodiment, the projector 8 capable of correcting distortion of a projected image is explained.

Figure 2:
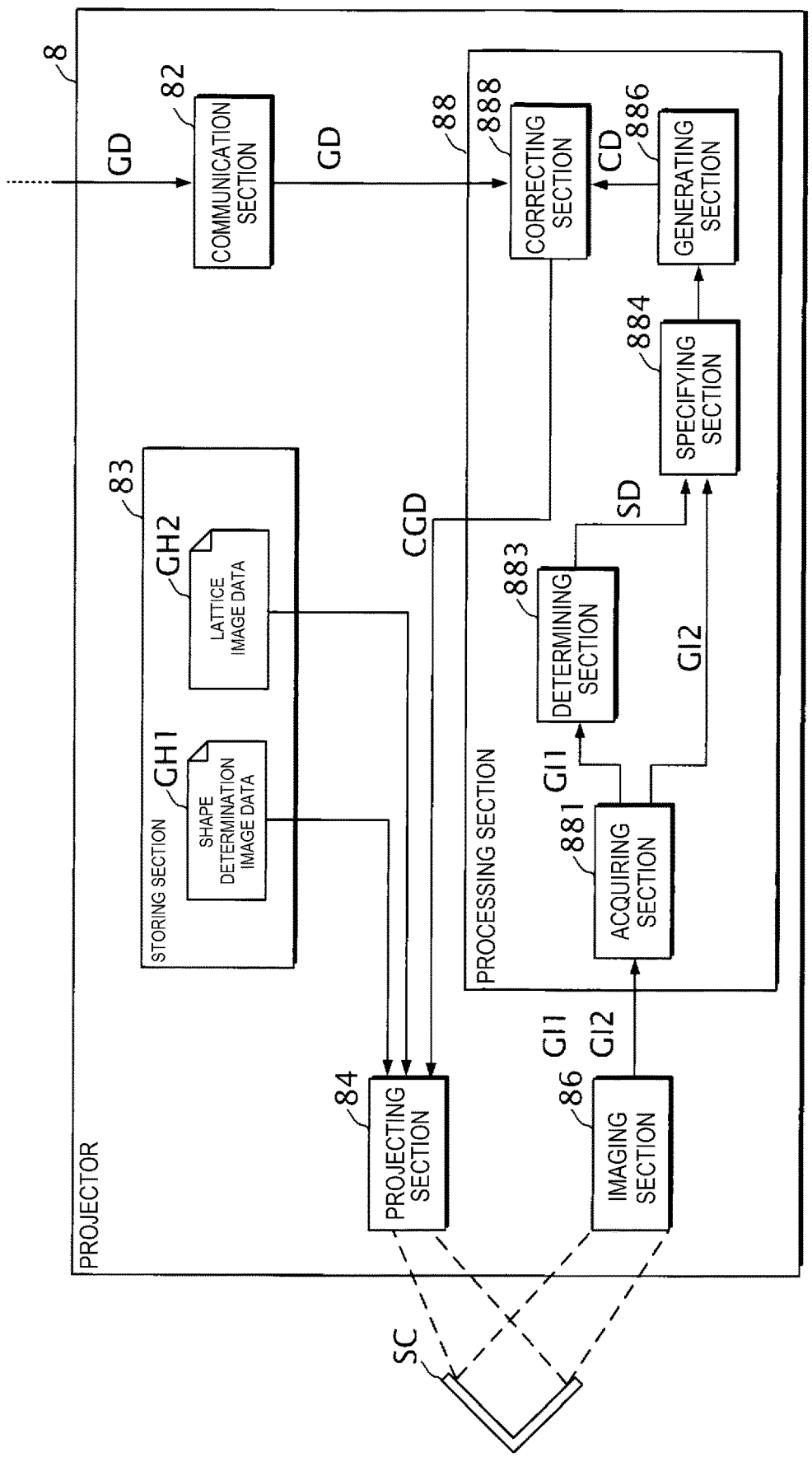
FIG. 2 is a diagram showing a configuration example of a projector.

The image providing device 4 inputs image data GD to the projector 8. The projector 8 corrects the input image data GD, generates corrected image data CGD obtained by correcting the image data GD, and projects a corrected image CG based on the corrected image data CGD onto a projection surface SC. The corrected image data CGD is shown in FIG. 2.

The correction applied to the image data GD is processing for correcting distortion of an image projected onto the projection surface SC. As a situation in which distortion of an image occurs, there are, for example, two situations explained below. A first situation is a situation in which the projection surface SC is not one plane, for example, the projection surface SC includes a plurality of planes crossing one another, the projection surface SC is a curved surface, or unevenness is present on the projection surface SC. A second situation is a situation in which the projector 8 obliquely projects an image onto the projection surface SC. The shape of the projection surface SC shown in FIG. 1 is a shape formed by a first plane PL1 and a second plane PL2 crossing the first plane PL1.

The projector 8 corrects an image projected onto the projection surface SC to offset distortion of the image and generates the corrected image data CGD.

In the following explanation, an X axis, a Y axis, and a Z axis are defined. The X axis, the Y axis, and the Z axis are orthogonal to one another. It is assumed that a placement surface MS for the projector 8 is parallel to an XZ plane. The Y axis is perpendicular to the placement surface MS. Further, to simplify explanation, when the projection surface SC is formed by the first plane PL1 and the second plane PL2, it is assumed that the first plane PL1 and the second plane PL2 are orthogonal to each other, the first plane PL1 is parallel to a YZ plane, and the second plane PL2 is parallel to an XY plane.

A. 2. Configuration of the First Embodiment

A configuration example of the projector 8 is shown in FIG. 2. The projector 8 includes a communication section 82, a storing section 83, a projecting section 84, an imaging section 86, and a processing section 88. The communication section 82 is a device that communicates with other devices such as the image providing device 4 via a network such as the Internet. The communication section 82 includes a circuit for communicating with the other devices through wireless communication or wired communication. The communication section 82 receives the image data GD from the image providing device 4.

The storing section 83 is a recording medium readable by the processing section 88. The storing section 83 is configured by one or more kinds of storage circuits such as a ROM (Read Only Memory), an EPROM (Erasable Programmable ROM), an EEPROM (Electrically Erasable Programmable ROM), and a RAM (Random Access Memory). The storing section 83 stores a plurality of programs including a control program to be executed by the processing section 88, shape determination image data GH1, and lattice image data GH2.

A shape determination image G1 indicated by the shape determination image data GH1 is an example of a "first image". A lattice image G2 indicated by the lattice image data GH2 is an example of a "second image".

The shape determination image data GH1 is used to determine a type of a three-dimensional shape on the projection surface SC. As the shape determination image G1, there are, for example, two forms explained below. The shape determination image G1 in a first form is an image including a stripe pattern.

Figure 3:
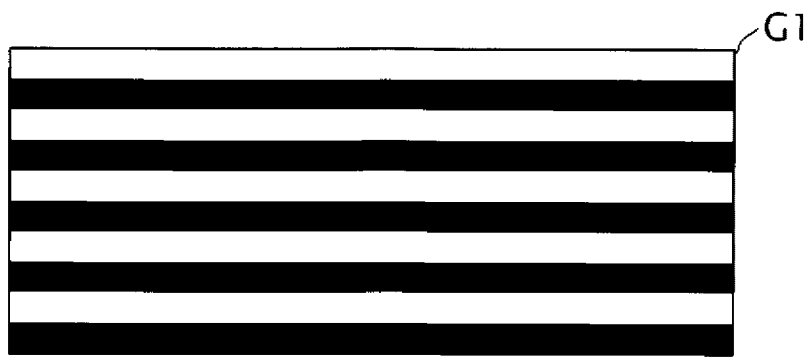
FIG. 3 is a diagram showing a shape determination image in a first aspect.

FIG. 3 shows the shape determination image G1 in the first form. The shape determination image G1 is a stripe pattern formed by rectangles parallel in the lateral direction, a so-called stripe. In the shape determination image G1 shown in FIG. 3, white and black are used. The shape determination image G1 is not limited to a combination of white and black. Any combination of colors is possible. The shape determination image G1 in a second form is a rectangular image.

In the following explanation, the shape determination image G1 is the first form unless specifically described otherwise.

The lattice image data GH2 is used to generate correction data CD for correcting distortion of an image projected onto the projection surface SC.

Figure 4:
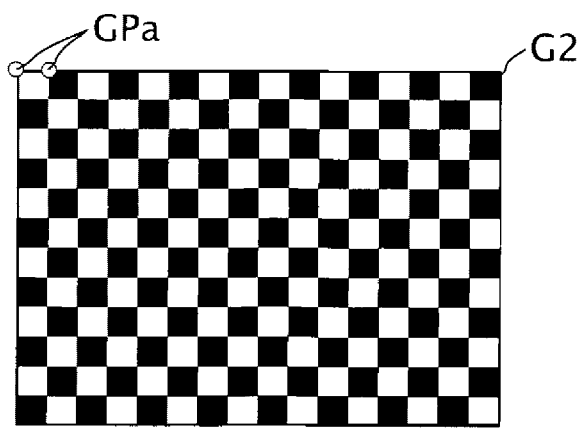
FIG. 4 is a diagram showing an example of a lattice image.

An example of the lattice image G2 is shown in FIG. 4. The lattice image G2 shows a plurality of lattice points GPa. The plurality of lattice points GPa are an example of a "plurality of points". The lattice image G2 is a lattice pattern formed by rectangles crossing one another. In the lattice image G2 shown in FIG. 4, white and black are used. The lattice image G2 is not limited to a combination of white and black. Any combination of colors is possible. The lattice image G2 is not limited to two colors. Three or more colors may be used. White circles shown in FIG. 4 indicate the lattice points GPa. In FIG. 4, in order to suppress complication of the drawing, only a part of the plurality of lattice points GPa is representatively denoted by signs. The white circles are shown for explanation and are not shown in an actual lattice image G2. The plurality of lattice points GPa are vertexes of regions where a plurality of rectangles cross.

Referring back to FIG. 2, the projecting section 84 projects an image onto the projection surface SC. For example, the projecting section 84 projects the shape determination image G1 onto the projection surface SC to thereby display a shape determination projected image PG1 shown in FIGS. 6 to 9 on the projection surface SC. The projecting section 84 projects the lattice image G2 onto the projection surface SC to thereby display a lattice projected image PG2 shown in FIG. 10.

The shape determination projected image PG1 is an example of a "first projected image". The lattice projected image PG2 is an example of a "second projected image".

Figure 5:
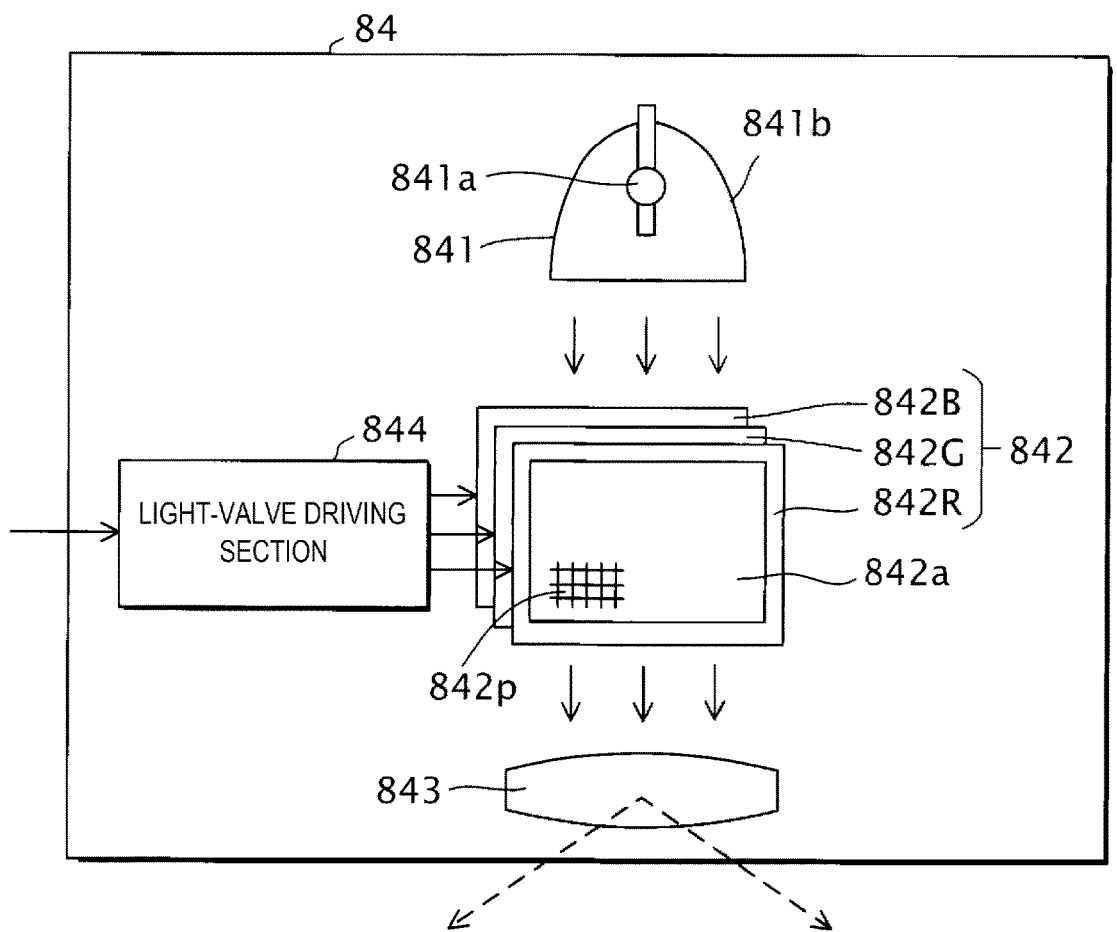
FIG. 5 is a diagram showing an example of a projecting section.

An example of the projecting section 84 is shown in FIG. 5. The projecting section 84 includes a light source 841, three liquid crystal light valves 842R, 842G, and 842B, which are examples of a light modulating device, a projection lens 843, which is an example of a projection optical system, and a light-valve driving section 844. The projecting section 84 modulates light emitted from the light source 841 with a liquid crystal light valve 842 to form an image and enlarges the image and projects the image from the projection lens 843. Consequently, the projection lens 843 displays images such as the shape determination projected image PG1 and the lattice projected image PG2 on the projection surface SC.

The light source 841 includes a light source section 841a formed by a Xenon lamp, an ultrahigh pressure mercury lamp, an LED, a laser light source, or the like and a reflector 841b that reduces fluctuation in a direction of light radiated by the light source section 841a. LED is an abbreviation of Light Emitting Diode. Fluctuation in a luminance distribution of light emitted from the light source 841 is reduced by a not-shown integrator optical system. Thereafter, the light is separated into color light components of red, green, and blue, which are the three primary colors of light, by a not-shown color separation optical system. The color light components of red, green, and blue are respectively made incident on the liquid crystal light valves 842R, 842G, and 842B.

The liquid crystal light valve 842 is configured by, for example, a liquid crystal panel in which liquid crystal is encapsulated between a pair of transparent substrates. In the liquid crystal light valve 842, a rectangular pixel region 842a formed by a plurality of pixels 842p arrayed in a matrix shape is formed. In the liquid crystal light valve 842, a driving voltage can be applied to the liquid crystal for each of the pixels 842p. When the light-valve driving section 844 applies a driving voltage corresponding to the image data GD to the pixels 842p, the pixels 842p are set to light transmittance corresponding to the image data GD. Accordingly, the light emitted from the light source 841 is transmitted through the pixel region 842a to be modulated. An image to be projected onto the projection surface SC is formed for each of the color lights.

Referring back to FIG. 2, the imaging section 86 is a device that images the projection surface SC and outputs imaging data indicating a captured image. The output captured image is formed by, for example, a plurality of pixels arranged in a matrix shape. The imaging data includes data concerning luminance and the like for each of pixels of the captured image. The imaging section 86 includes, for example, an imaging optical system and an imaging element. The imaging optical system is an optical system including at least one imaging lens. The imaging optical system may include various optical elements such as a prism or may include a zoom lens and a focus lens. The imaging element is configured by, for example, a CCD image sensor or a CMOS image sensor. CCD is an abbreviation of Charge Coupled Device. CMOS is an abbreviation of Complementary MOS.

The imaging section 86 outputs shape determination imaging data GI1 obtained by capturing the shape determination projected image PG1. The imaging section 86 outputs lattice imaging data GI2 obtained by capturing the lattice projected image PG2. The shape determination imaging data GI1 is an example of "first imaging data". The lattice imaging data GI2 is an example of "second imaging data".

The processing section 88 is a computer such as a CPU. CPU is an abbreviation of Central Processing Unit. The processing section 88 may be configured by one or a plurality of processors. The processing section 88 reads and executes programs stored in the storing section 83 to thereby function as an acquiring section 881, a determining section 883, a specifying section 884, a generating section 886, and a correcting section 888.

The acquiring section 881 acquires the shape determination imaging data GI1. The acquiring section 881 acquires the lattice imaging data GI2.

The determining section 883 determines, based on the shape determination imaging data GI1, a type of a three-dimensional shape on the projection surface SC. More specifically, the determining section 883 determines the type of the three-dimensional shape on the projection surface SC out of a plurality of types concerning three-dimensional shapes. The plurality of types concerning the three-dimensional shapes are a plane shape, a shape formed by the first plane PL1 and the second plane PL2 shown in FIG. 1, a shape of a side surface of a cylinder, a shape of a side surface of an elliptical cylinder, and a shape formed by projecting the projection surface SC on a sine curve in a plan view from a direction perpendicular to the placement surface MS of the projector 8. The direction perpendicular to the placement surface MS of the projector 8 is, in other words, a +Y direction and a −Y direction.

In the following explanation, the shape formed by the first plane PL1 and the second plane PL2 is referred to as "corner surface shape". The shape of the side surface of the cylinder and the shape of the side surface of the elliptical cylinder are collectively referred to as "cylinder side surface shape". The shape formed by projecting the projection surface SC on the sine curve in the plan view from the direction perpendicular to the placement surface MS of the projector 8 is referred to as "sine curve surface shape".

The plane shape, the corner surface shape, the cylinder side surface shape, and the sine curve surface shape are examples of a "first type" and a "second type".

Figure 6:
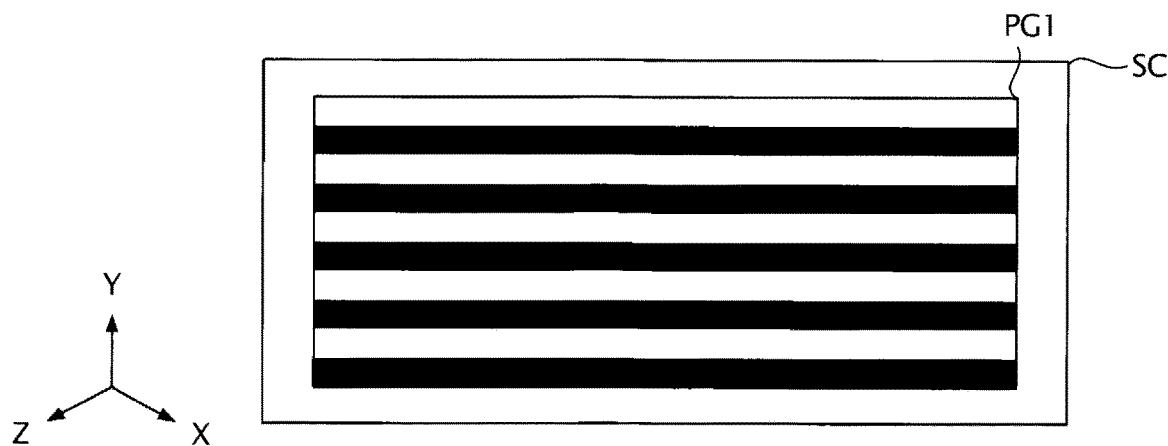
FIG. 6 is a diagram showing an example of a shape determination projected image formed when a type of a three-dimensional shape on a projection surface is a plane shape.

An example of the shape determination projected image PG1 formed when the type of the three-dimensional shape on the projection surface SC is the plane shape is shown in FIG. 6. When the projection surface SC has the plane shape, the shape of the shape determination projected image PG1 is a square.

Figure 7:
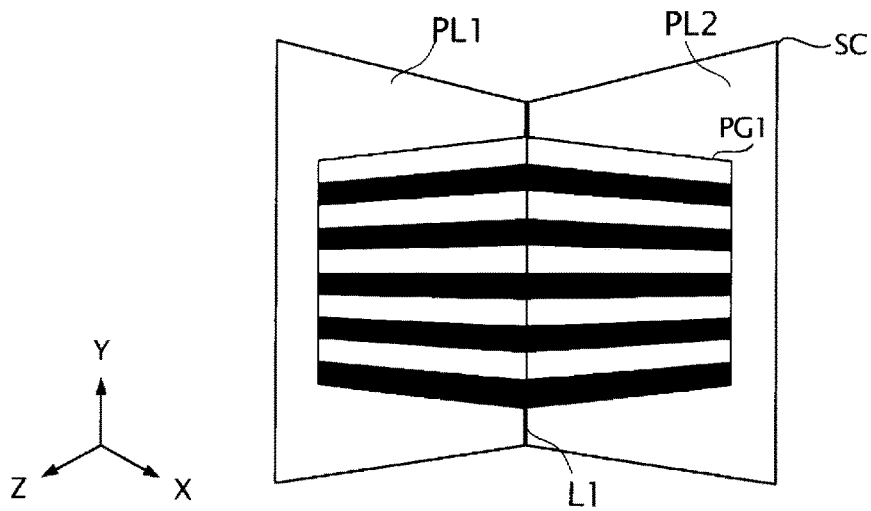
FIG. 7 is a diagram showing an example of the shape determination projected image formed when the type of the three-dimensional shape on the projection surface is a corner surface shape.

An example of the shape determination projected image PG1 formed when the type of the three-dimensional shape on the projection surface SC is the corner surface shape is shown in FIG. 7. When the projection surface SC has the corner surface shape, the shape of the shape determination projected image PG1 is a shape formed by bending the square along a straight line L1 on which the first plane PL1 and the second plane PL2 cross.

Figure 8:
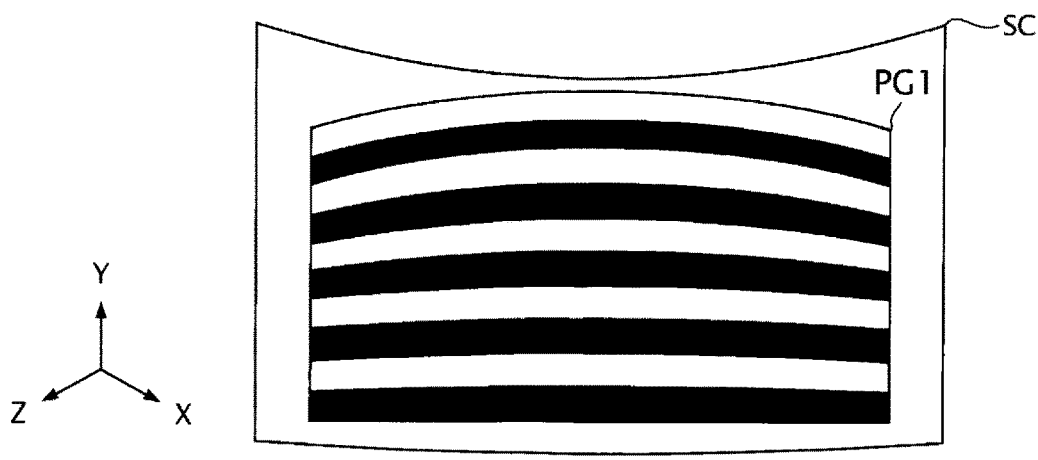
FIG. 8 is a diagram showing an example of the shape determination projected image formed when the type of the three-dimensional shape on the projection surface is a cylinder side surface shape.

An example of the shape determination projected image PG1 formed when the type of the three-dimensional shape on the projection surface SC is the cylinder side surface shape is shown in FIG. 8. When the projection surface SC has the cylinder side surface shape, the shape of the shape determination projected image PG1 is a shape formed by drawing arcs of the upper side and the lower side of the square to separate from the center of the square.

Figure 9:
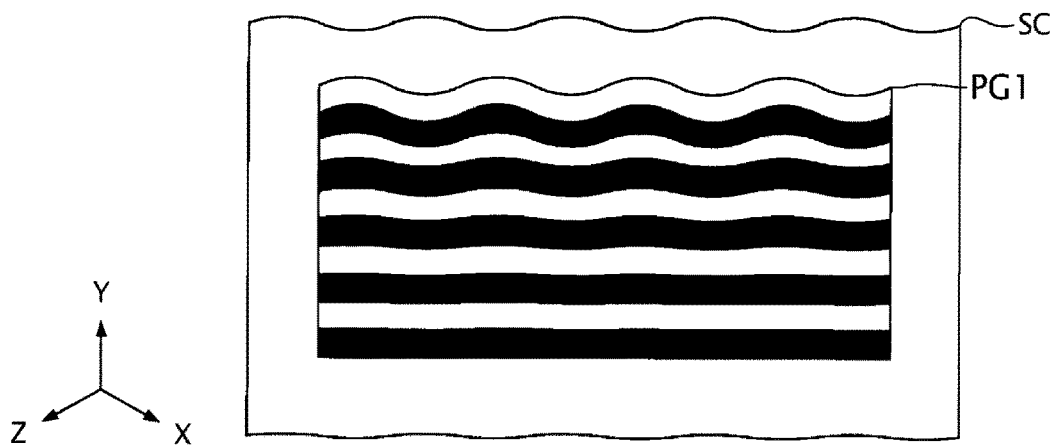
FIG. 9 is a diagram showing an example of the shape determination projected image formed when the type of the three-dimensional shape on the projection surface is a sine curve surface shape.

An example of the shape determination projected image PG1 formed when the type of the three-dimensional shape on the projection surface SC is the sine curve surface shape is shown in FIG. 9. When the projection surface SC has the sine curve surface shape, the shape of the shape determination projected image PG1 is a shape formed by drawing sine curves of the upper side and the lower side of the square.

Referring back to FIG. 2, the determining section 883 determines, based on a line segment included in the shape determination projected image PG1 indicated by the shape determination imaging data GI1, a type of a three-dimensional shape on the projection surface SC out of the plurality of types concerning the three-dimensional shapes. The line segment included in the shape determination projected image PG1 is a line segment corresponding to a boundary line between the rectangles forming the stripe pattern in the shape determination image G1. When the shape determination image G1 is the second form, the line segment included in the shape determination projected image PG1 is a line segment corresponding to the upper side or the lower side of the rectangle in the shape determination image G1.

When the line segment included in the shape determination projected image PG1 is one straight line not bent, the determining section 883 determines that the type of the three-dimensional shape on the projection surface SC is the plane shape. When the line segment included in the shape determination projected image PG1 is a polygonal line, the determining section 883 determines that the type of the three-dimensional shape on the projection surface SC is the corner surface shape. When the line segment included in the shape determination projected image PG1 is a chord of a circle or an ellipse, the determining section 883 determines that the type of the three-dimensional shape on the projection surface SC is the cylinder side surface shape. When the line segment included in the shape determination projected image PG1 is the sine curve, the determining section 883 determines that the type of the three-dimensional shape on the projection surface SC is the sine curve surface shape.

The determining section 883 outputs shape data SD indicating the type of the three-dimensional shape on the projection surface SC. The shape data SD is an identifier indicating the type of the three-dimensional shape on the projection surface SC. The shape data SD is any one of an identifier indicating the plane shape, an identifier indicating the corner surface shape, an identifier indicating the cylinder side surface shape, an identifier indicating the sine curve surface shape, and an identifier indicating that the type of the three-dimensional shape on the projection surface SC cannot be determined.

The specifying section 884 specifies, based on the lattice imaging data GI2 and the type of the three-dimensional shape on the projection surface SC indicated by the shape data SD, positions of a respective plurality of lattice points GPb on the projection surface SC. More specifically, the specifying section 884 specifies three-dimensional coordinates concerning the respective plurality of lattice points GPb based on the lattice imaging data GI2, applies processing for correcting, based on the type of the three-dimensional shape on the projection surface SC, a plurality of three-dimensional coordinates specified concerning the respective plurality of lattice points GPb, and specifies positions of the respective plurality of lattice points GPb on the projection surface SC. For example, when the type of the three-dimensional shape on the projection surface SC is the corner surface shape, the specifying section 884 applies, concerning the specified respective plurality of lattice points GPb of the lattice imaging data GI2, processing for performing predetermined correction and specified positions of the respective plurality of lattice points GPb on the projection surface SC. When the type of the three-dimensional shape on the projection surface SC is the cylinder side surface shape, the specifying section 884 applies, concerning the specified respective plurality of lattice points GPb of the lattice imaging data GI2, processing for performing correction different from the correction performed when the three-dimensional shape on the projection surface SC is the corner surface shape and specifies positions of the respective plurality of lattice points GPb on the projection surface SC. The plurality of lattice points GPb are lattice points shown in the lattice projected image PG2 indicated by the lattice imaging data GI2 and correspond to the lattice points GPa included in the lattice image G2. The processing for correcting, based on the type of the three-dimensional shape on the projection surface SC, the plurality of three-dimensional coordinates specified concerning the respective plurality of lattice points GPb includes fitting processing and filtering processing.

Figure 10:
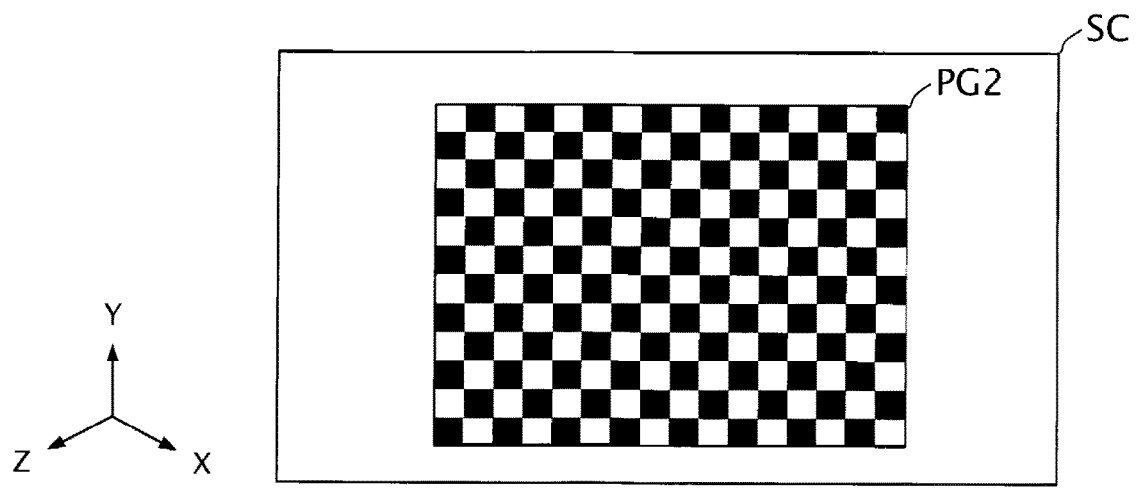
FIG. 10 is a diagram showing an example of a lattice projected image formed when the type of the three-dimensional shape on the projection surface is the plane shape.

An example of the lattice projected image PG2 on the projection surface SC is shown in FIG. 10. When the projection surface SC has the plane shape, the lattice projected image PG2 is not distorted. However, when the projection surface SC has the corner surface shape, the cylinder side surface shape, or the sine curve surface shape, the lattice projected image PG2 is distorted like the shape determination projected image PG1.

Figure 11:
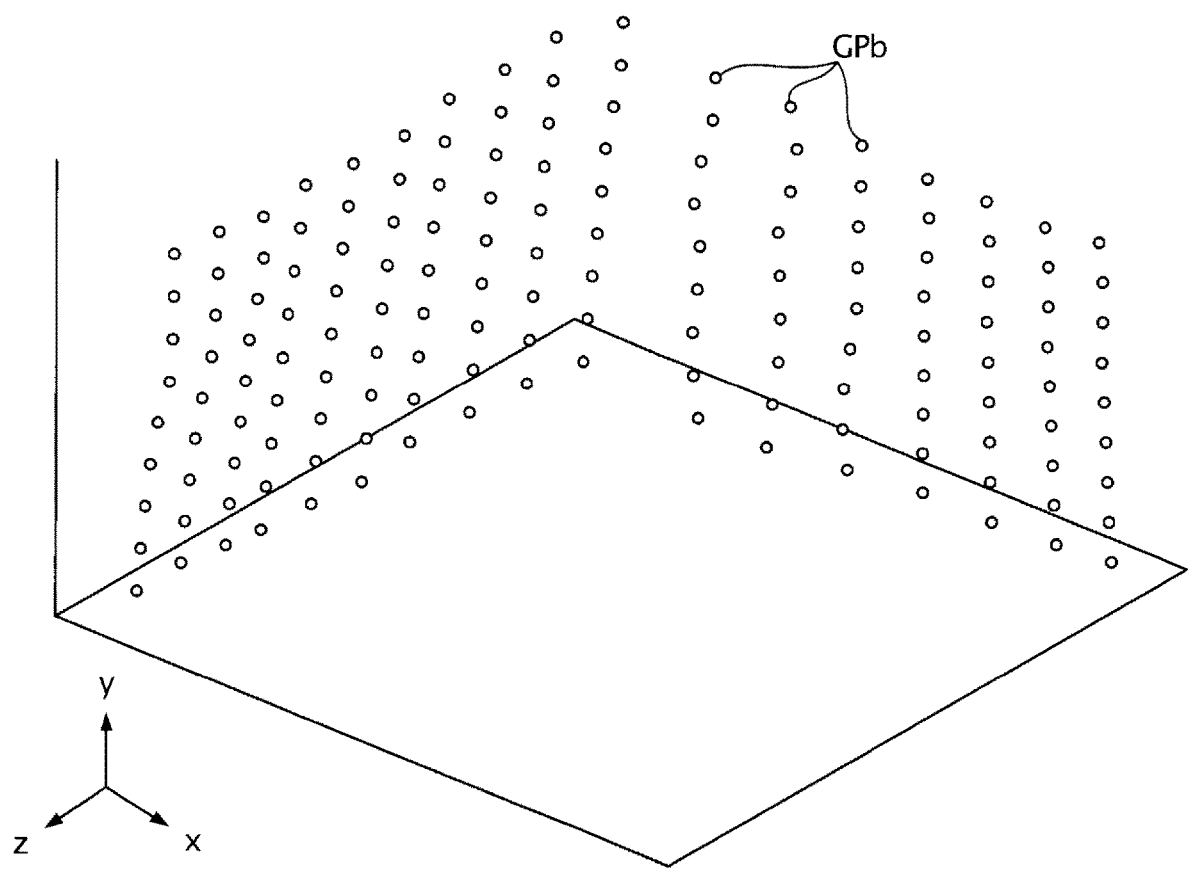
FIG. 11 is a diagram showing three-dimensional coordinates of a plurality of lattice points specified based on lattice imaging data.

Three-dimensional coordinates of the lattice points GPb specified based on the lattice imaging data GI2 are shown in FIG. 11. In FIG. 11, the lattice points GPb in an xyz space, which is a virtual space simulating an XYZ space, are shown. In the following explanation, three axes orthogonal to one another in the xyz space are represented as an x axis, a y axis, and a z axis and distinguished from the X axis, the Y axis, and the Z axis. White circles shown in FIG. 11 are the lattice points GPb. In FIG. 11, in order to suppress complication of the drawing, only a part of the plurality of lattice points GPb is representatively denoted by signs.

Figure 12:
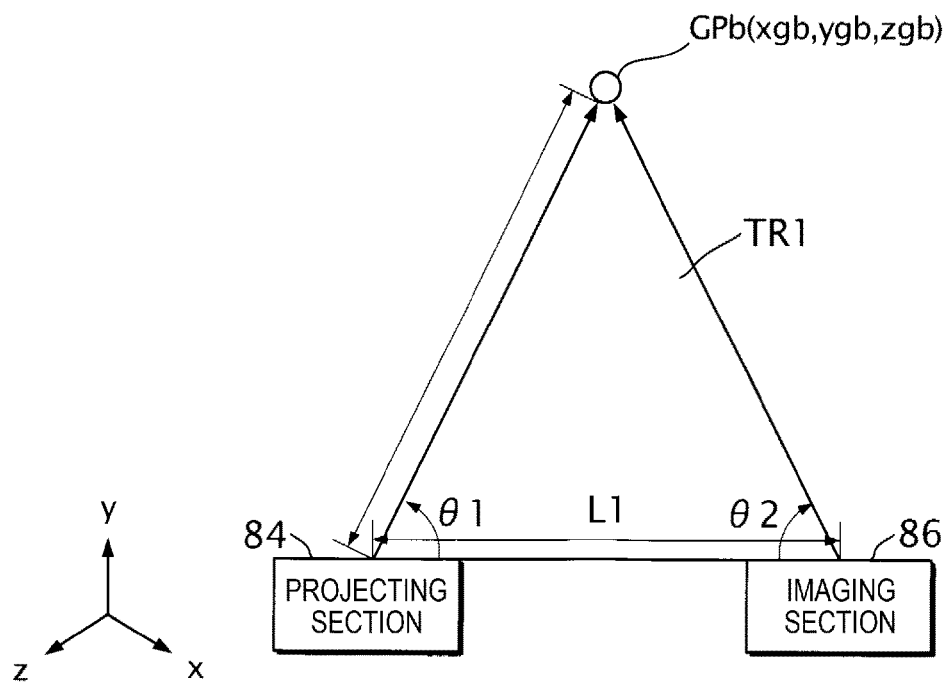
FIG. 12 is a diagram showing a specifying example of a three-dimensional coordinate of the lattice point.

A specific example of a three-dimensional coordinate of the lattice point GPb is shown in FIG. 12. As shown in FIG. 12, a triangle TR1 having the projecting section 84, the imaging section 86, and the lattice point GPb as vertexes is formed. Length L1 of a side connecting the projecting section 84 and the imaging section 86 is a value determined in advance when the projector 8 is designed. Of an angle θ1 and an angle θ2 at both ends of the side connecting the projecting section 84 and the imaging section 86, the angle θ1 in the direction of the projecting section 84 is a value specified by a direction in which the projecting section 84 projects an image and a position of the lattice point GPb in the lattice image G2. The angle θ2 is a value specified by a direction in which the imaging section 86 captures an image and a position of the lattice point GPb in an image indicated by the lattice imaging data GI2. The length L1, the angle θ1, and the angle θ2 are specified, whereby the projector 8 can specify the triangle TR1. Therefore, the projector 8 can specify a three-dimensional coordinate (xgb, ygb, zgb) of the lattice point GPb, which is the vertex of the triangle TR1.

However, a measurement error is sometimes included in the three-dimensional coordinate of the lattice point GPb specified by the triangulation. Therefore, the specifying section 884 executes the fitting processing and the filtering processing.

In the fitting processing, the specifying section 884 calculates, based on the three-dimensional coordinate of the lattice point GPb, an equation for a three-dimensional shape on the projection surface SC indicated by the shape data SD. In the following explanation, a surface satisfying the equation for the three-dimensional shape on the projection surface SC is referred to as "fitting surface". For example, when the type of the three-dimensional shape on the projection surface SC is the plane shape, the specifying section 884 specifies an equation for a plane forming the projection surface SC with the method of least squares using the three-dimensional coordinate of the lattice point GPb as an argument. More specifically, the specifying section 884 calculates, with respect to the equation for the plane described below, a coefficient "a", a coefficient "b", a coefficient "c", and a constant "d" with the method of least squares using the three-dimensional coordinate of the lattice point GPb as an argument.

$$ax+by+cz=d$$

When the type of the three-dimensional shape on the projection surface SC is the corner surface shape, the specifying section 884 specifies equations for a respective plurality of planes forming the projection surface SC with the method of least squares using the three-dimensional coordinate of the lattice point GPb as an argument.

When the type of the three-dimensional shape on the projection surface SC is the cylinder side surface shape or the sine curve surface shape, the specifying section 884 specifies an equation for a curved surface forming the projection surface SC with an algorithm for solving a nonlinear minimum square problem such as an LM method using the three-dimensional coordinate of the lattice point GPb as an argument. LM is an abbreviation of Levenberg-Marquardt.

Figure 13:
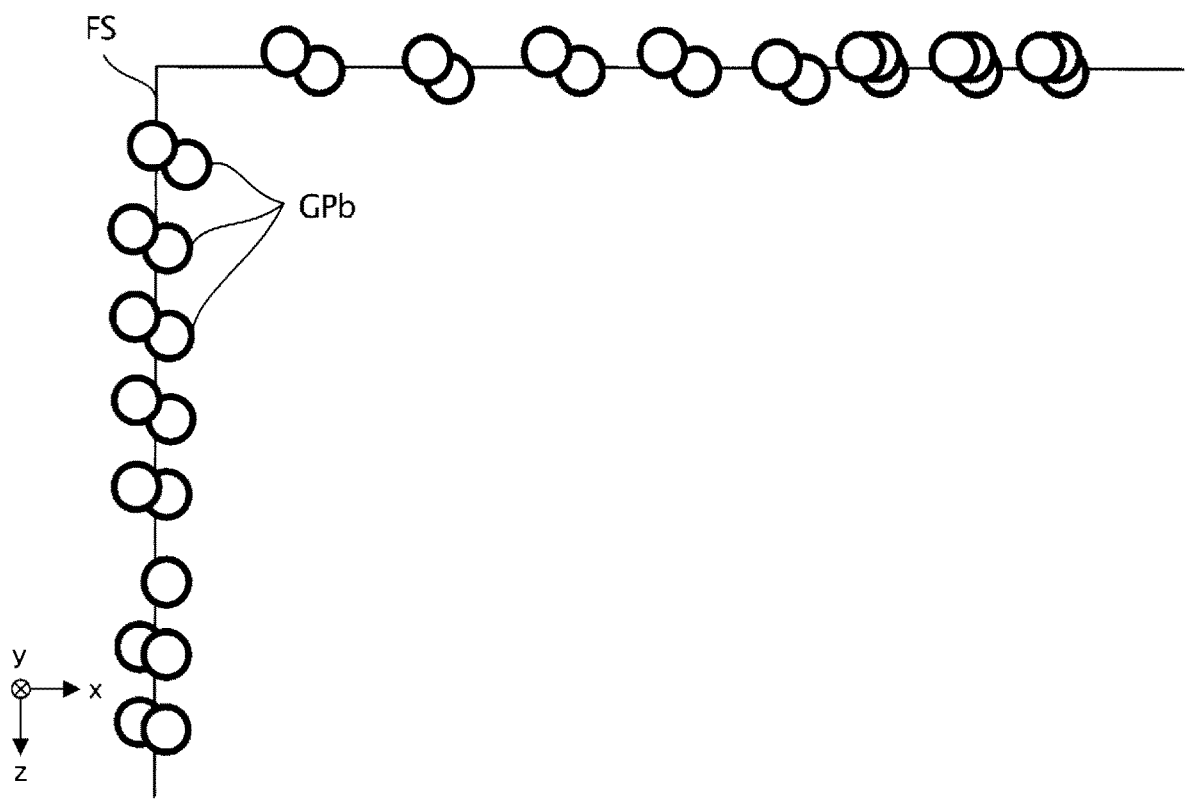
FIG. 13 is a diagram showing an example of fitting processing performed when the type of the three-dimensional shape on the projection surface is the corner surface shape.

In FIG. 13, an example of the fitting processing performed when the type of the three-dimensional shape on the projection surface SC is the corner surface shape is shown. In FIG. 13, a fitting surface FS and the lattice point GPb in an xz plan view at the time when the xyz space is viewed from a +y direction are shown. In FIG. 13, in order to suppress complication of the drawing, only a part of the plurality of lattice points GPb is representatively denoted by signs. The fitting surface FS shown in FIG. 13 is formed by points satisfying an equation obtained by the method of least squares.

In the filtering processing, the specifying section 884 projects the plurality of lattice points GPb onto the fitting surface FS in the xyz space. More specifically, the specifying section 884 projects the plurality of lattice points GPb in the normal vector direction of the fitting surface FS.

Subsequently, the specifying section 884 specifies, in the xyz space, with respect to the plurality of lattice points GPb after the projection, regression lines VL with respect to the lattice points GPb in columns and regression lines HL with respect to the lattice points GPb in rows using the method of least squares. The specifying section 884 specifies intersections of the regression lines VL and the regression lines HL as a plurality of lattice points GPb' after the correction.

Figure 14:
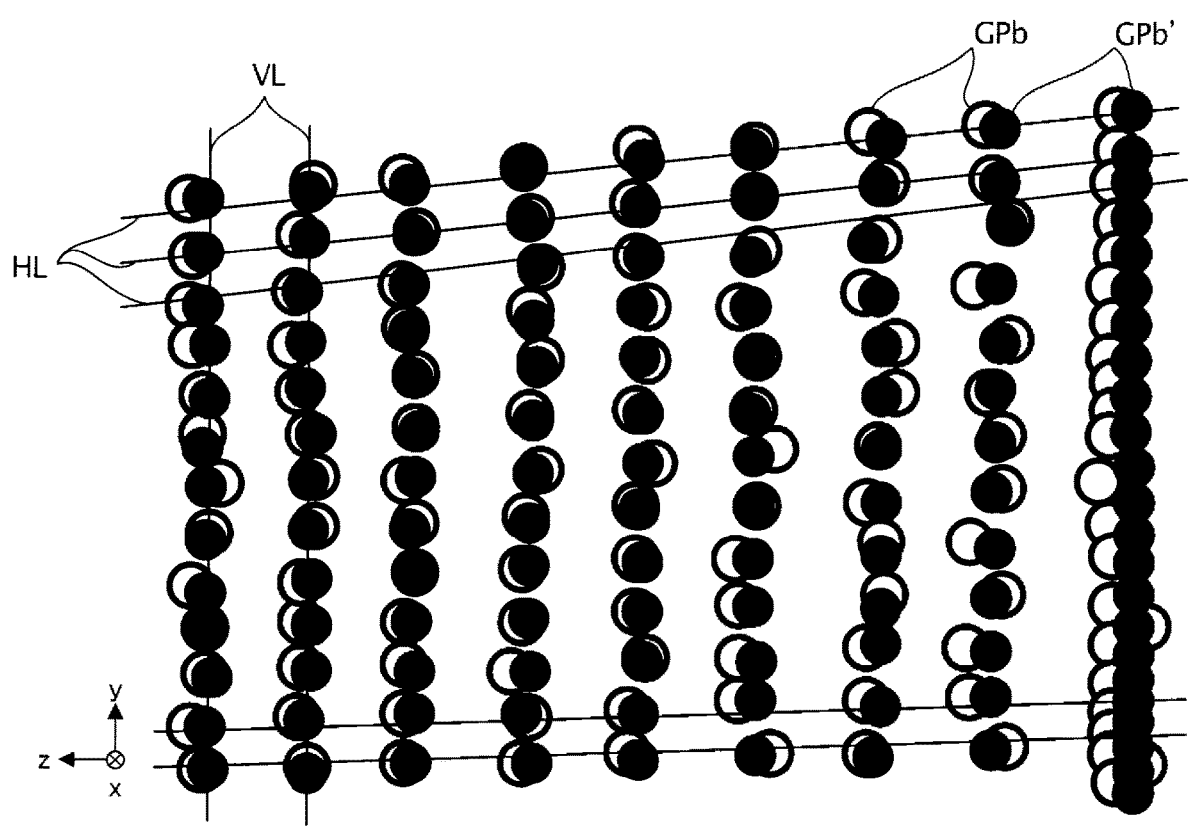
FIG. 14 is a diagram showing an example of regression lines and a plurality of lattice points after correction.

In FIG. 14, an example of the regression lines and the plurality of lattice points GPb' after the correction is shown. In FIG. 14, the plurality of lattice points GPb, the regression lines VL, and the regression lines HL, and the plurality of lattice points GPb' after the correction in a yz plan view at the time when the xyz space is viewed from a +x direction are shown. Black circles shown in FIG. 14 are the lattice points GPb'. In FIG. 14, in order to suppress complication of the drawing, a part of the plurality of lattice points GPb is representatively denoted by signs. A part of the plurality of lattice points GPb' is representatively denoted by signs.

Figure 15:
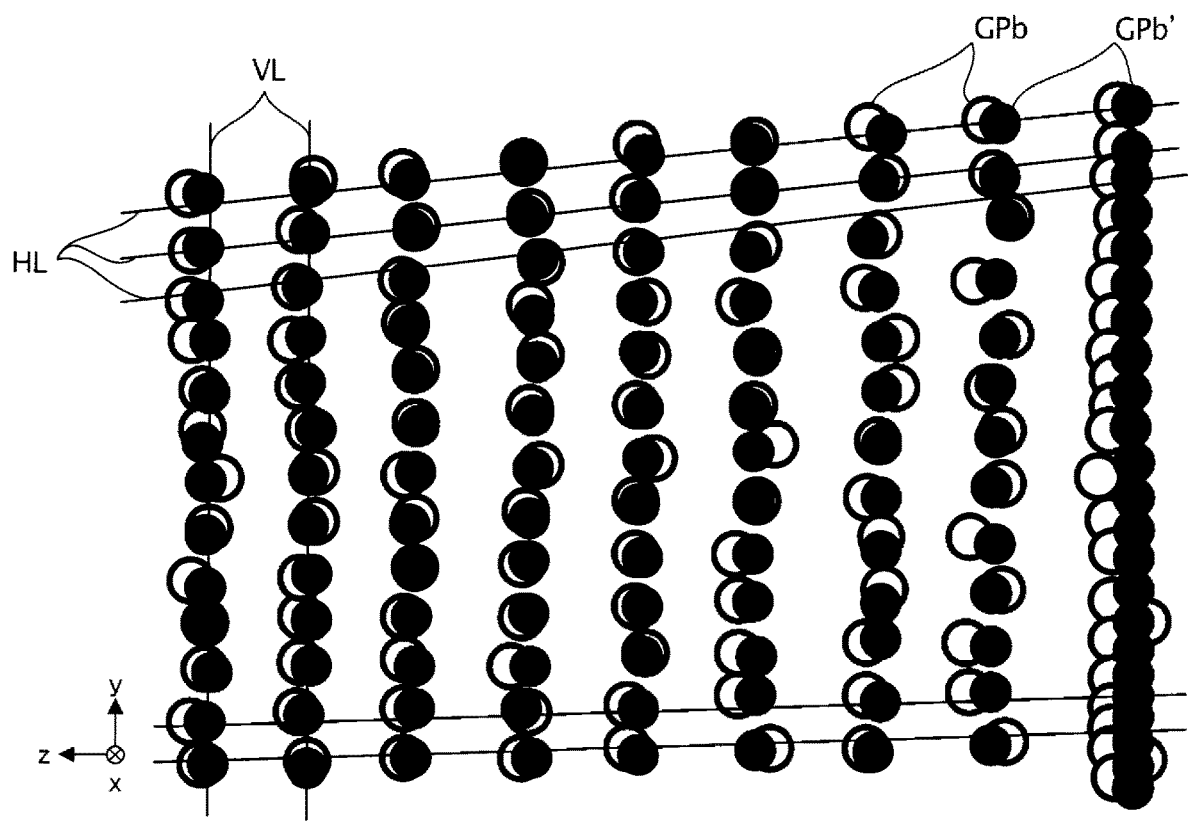
FIG. 15 is a diagram showing the plurality of lattice points after the correction in filtering processing.

In FIG. 15, the plurality of lattice points GPb after the correction after the filtering processing are shown. In FIG. 15, the plurality of lattice points GPb' after the correction in the xyz space are shown. The plurality of lattice points GPb' after the correction are further aligned compared with the plurality of lattice points GPb shown in FIG. 11.

Referring back to FIG. 2, the generating section 886 generates the correction data CD based on the positions of the respective plurality of lattice points GPb' after the correction. A specific example and a generation example of the correction data CD are explained in explanation about the correcting section 888.

The correcting section 888 corrects the image data GD based on the correction data CD. The correction data CD indicates unit regions UA after modification obtained by modifying a plurality of unit regions UA obtained by dividing the projection region PR onto which an image is projected by the projecting section 84. The correcting section 888 corrects divided images obtained by dividing the image indicated by the image data GD according to the unit regions UA before the modification to fit in the unit regions UA after the modification indicated by the correction data CD.

Figure 16:
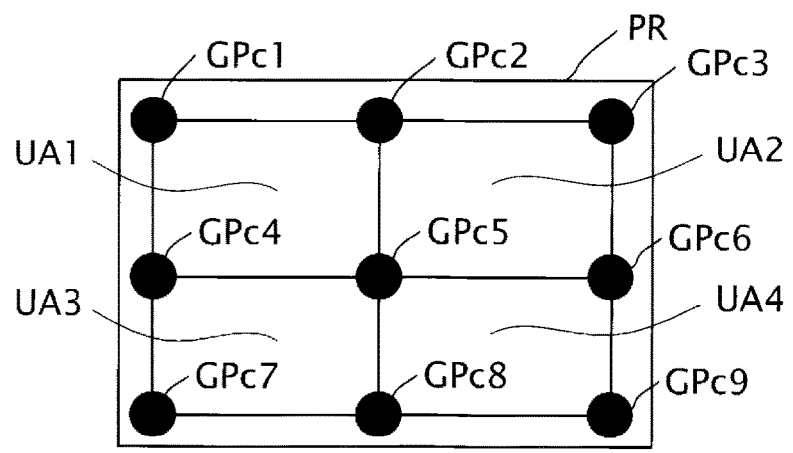
FIG. 16 is a diagram showing an example of a plurality of unit regions before the correction.

In FIG. 16, an example of the plurality of unit regions UA before the correction is shown. A unit region UA1, a unit region UA2, a unit region UA3, and a unit region UA4 shown in FIG. 16 are regions obtained by dividing the projection region PR. A lattice point GPc1, a lattice point GPc2, a lattice point GPc3, a lattice point GPc4, a lattice point GPc5, a lattice point GPc6, a lattice point GPc7, a lattice point GPc8, and a lattice point GPc9 are located at vertexes respectively in the unit region UA1, the unit region UA2, the unit region UA3, and the unit region UA4. The number of lattice points GPc may coincide with or may be different from the number of the lattice points GPa. As shown in FIG. 16, the shape of the respective unit regions UA before the correction is a rectangular shape.

In the following explanation, when elements of the same type are distinguished, reference signs are used like the lattice point GPc1 and the lattice GPc2. On the other hand, when the elements of the same type are not distinguished, only a common sign in a reference sign is used like the lattice point GPc.

The number of the lattice points GPc only has to be enough for forming two or more unit regions UA. In an example shown in FIG. 15, to facilitate explanation, nine lattice points GPc and two unit regions UA are shown.

Figure 17:
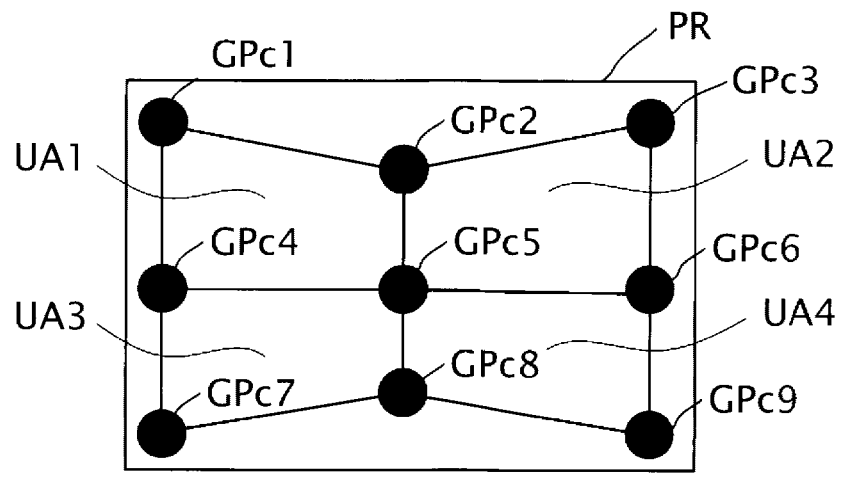
FIG. 17 is a diagram showing an example of the plurality of unit regions after the correction.

In FIG. 17, an example of the plurality of unit regions UA after the correction is shown. In FIG. 17, a deformed state of the shape of the plurality of unit regions UA is shown. Specifically, in FIG. 17, the lattice point GPc2 is moved in the downward direction, the lattice point GPc8 is moved in the upward direction, and the unit region UA1, the unit region UA2, the unit region UA3, and the unit region UA4 are deformed. The correcting section 888 corrects images in the unit regions UA before the deformation to fit in the unit regions UA after the deformation. Content of the correction data CD is positions of the lattice points GPc after the deformation of the unit regions UA. The corrected image CG corrected according to the positions of the lattice points GPc after the deformation shown in FIG. 17 is distorted if the type of the three-dimensional shape on the projection surface SC is the plane shape. However, when the type of the three-dimensional shape on the projection surface SC is the corner surface shape, an image without distortion is obtained.

As a generation example of the correction data CD, the generating section 886 causes, for example, in the xyz space, the projecting section 84 to project any image, for example, the lattice image G2 from the position of the projecting section 84 and simulates an image at the time when the projection surface SC is viewed from the imaging section 86 to generate the correction data CD. The generating section 886 generates the correction data CD such that the image at the time when the projection surface SC is seen is rectangular.

Referring back to FIG. 2, the projecting section 84 projects the corrected image CG based on the corrected image data CGD obtained by correcting the image data GD onto the projection surface SC.

A. 3. Operation in the First Embodiment

The operation of the projector 8 is explained with reference to FIGS. 18 to 22. The projector 8 executes correction data generation processing for generating the correction data CD and image data projection processing for correcting the image data GD based on the correction data CD and projecting the corrected image CG based on the corrected image data CGD.

Figure 18:
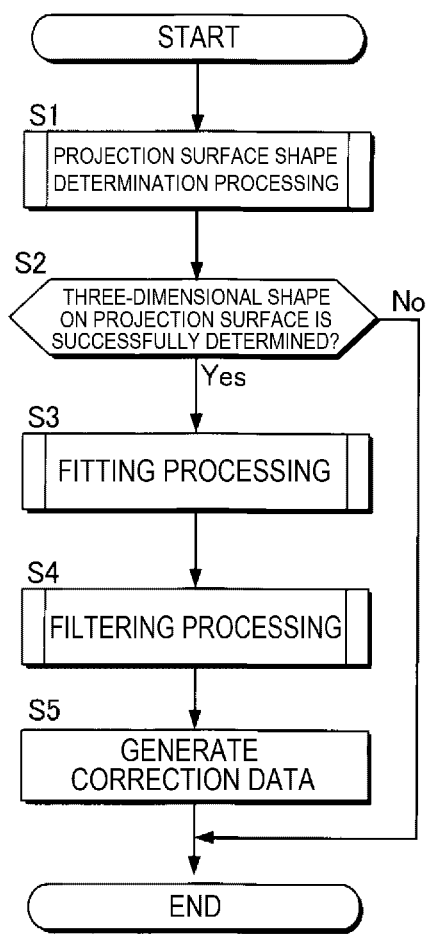
FIG. 18 is a flowchart showing correction data generation processing.

FIG. 18 is a flowchart showing the correction data generation processing. In step S1, the projector 8 executes projection surface shape determination processing shown in FIG. 19.

Figure 19:
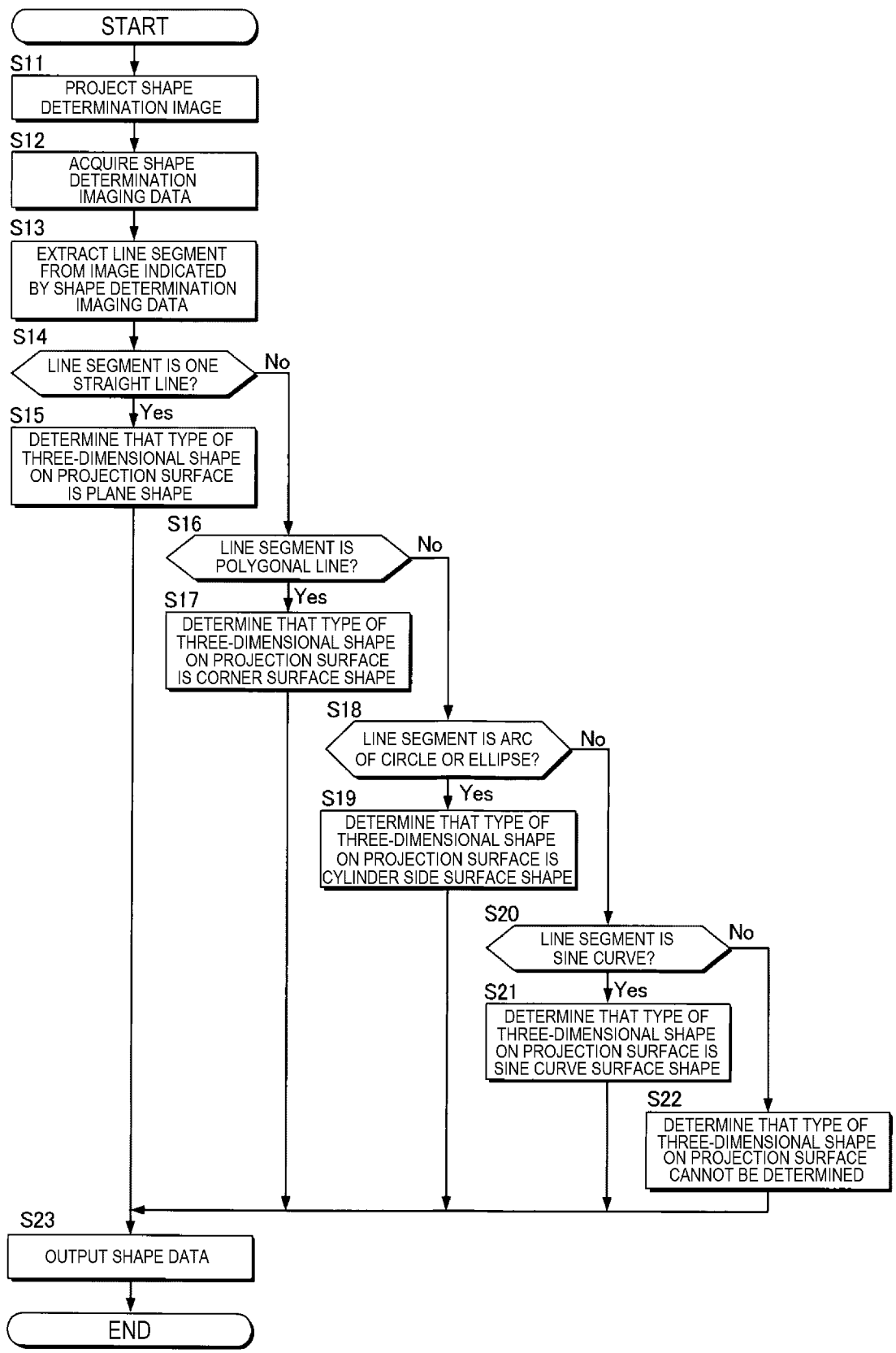
FIG. 19 is a flowchart showing projection surface shape determination processing.

FIG. 19 is a flowchart showing the projection surface shape determination processing. In step S11, the projecting section 84 projects the shape determination image G1 based on the shape determination image data GH1 to thereby display the shape determination projected image PG1 on the projection surface SC. Subsequently, in step S12, the acquiring section 881 acquires the shape determination imaging data GI1 obtained by the imaging section 86 capturing the shape determination projected image PG1. In step S13, the determining section 883 extracts a line segment from the shape determination projected image PG1 indicated by the shape determination imaging data GI1. Subsequently, in step S14, the determining section 883 determines whether the line segment is one straight line. When a determination result in step S14 is affirmative, in step S15, the determining section 883 determines that the type of the three-dimensional shape on the projection surface SC is the plane shape.

On the other hand, when the determination result in step S14 is negative, that is, when the line segment is not one straight line, in step S16, the determining section 883 determines whether the line segment is a polygonal line. When a determination result in step S16 is affirmative, in step S17, the determining section 883 determines that the type of the three-dimensional shape on the projection surface SC is the corner surface shape.

On the other hand, when the determination result in step S16 is negative, in step S18, the determining section 883 determines whether the line segment is an arc of a circle or an ellipse. When a determination result in step S18 is affirmative, in step S19, the determining section 883 determines that the type of the three-dimensional shape on the projection surface SC is the cylinder side surface shape.

On the other hand, when the determination result in step S18 is negative, that is, when the line segment is not an arc of a circle or an ellipse, in step S20, the determining section 883 determines whether the line segment is a sine curve. When a determination result in step S20 is affirmative, in step S21, the determining section 883 determines that the type of the three-dimensional shape on the projection surface SC is the sine curve surface shape.

On the other hand, when the determination result in step S20 is negative, that is, when the line segment is not a sine curve, in step S22, the determining section 883 determines that the type of the three-dimensional shape on the projection surface SC cannot be determined. After the processing in step S15, step S17, step S19, step S21, or step S22 ends, in step S23, the determining section 883 outputs the shape data SD indicating the type of the three-dimensional shape on the projection surface SC. After the processing in step S23 ends, the projector 8 ends a series of processing shown in FIG. 19 and executes the processing in step S2 shown in FIG. 18.

Referring back to FIG. 18, in step S2, the processing section 88 determines whether the type of the three-dimensional shape on the projection surface SC is successfully determined. When a determination result in step S2 is negative, that is, when the shape data SD is an identifier indicating that the type of the three-dimensional shape on the projection surface SC cannot be determined, the processing section 88 ends a series of processing shown in FIG. 18.

Figure 20:
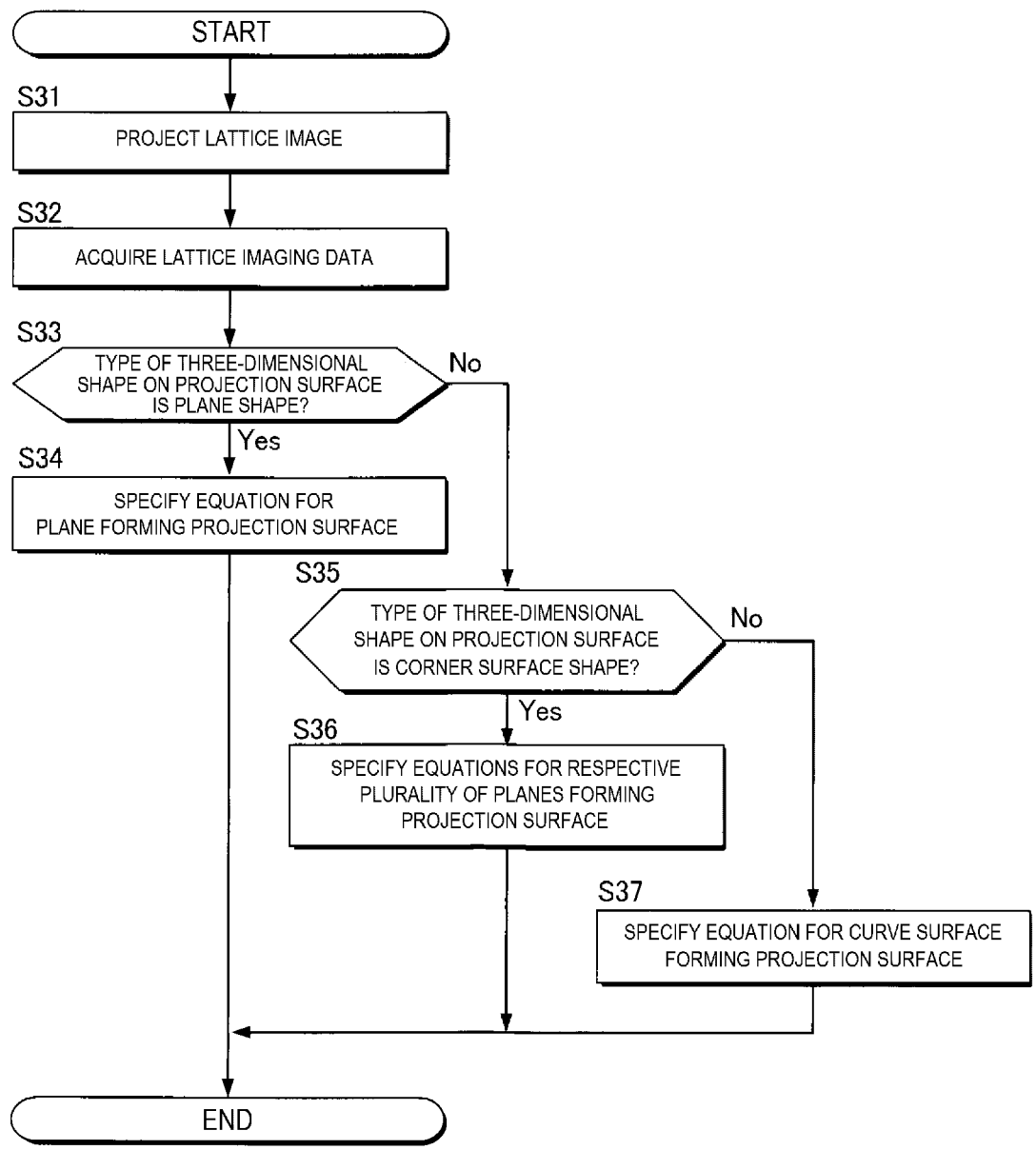
FIG. 20 is a flowchart showing the fitting processing.

On the other hand, when the determination result in step S2 is affirmative, that is, when the shape data SD is any one of the identifier indicating the plane shape, the identifier indicating the corner surface shape, the identifier indicating the cylinder side surface shape, and the identifier indicating the sine curve surface shape, in step S3, the specifying section 884 executes the fitting processing shown in FIG. 20.

FIG. 20 is a flowchart showing the fitting processing. In step S31, the projecting section 84 projects the lattice image G2 based on the lattice image data GH2 to thereby display the lattice projected image PG2 on the projection surface SC. Subsequently, in step S32, the acquiring section 881 acquires the lattice imaging data GI2 obtained by the imaging section 86 capturing the lattice projected image PG2. In step S33, the specifying section 884 determines whether the type of the three-dimensional shape on the projection surface SC indicated by the shape data SD is the plane shape. When a determination result in step S33 is affirmative, in step S34, the specifying section 884 specifies, with the method of least squares using the three-dimensional coordinate of the lattice point GPb as an argument, an equation for the plane forming the projection surface SC.

On the other hand, when the determination result in step S33 is negative, in step S35, the specifying section 884 determines whether the type of the three-dimensional shape on the projection surface SC is the corner surface shape. When a determination result in step S35 is affirmative, in step S36, the specifying section 884 specifies, with the method of least squares using the three-dimensional coordinate of the lattice point GPb as an argument, equations for the plurality of planes forming the projection surface SC.

On the other hand, when the determination result in step S35 is negative, that is, when the type of the three-dimensional shape on the projection surface SC indicated by the shape data SD is the cylinder side surface shape or the sine curve surface shape, in step S37, the specifying section 884 specifies, with an algorithm for solving a nonlinear minimum square problem such as an LM method using the three-dimensional coordinate of the lattice point GPb as an argument, an equation for the curved surface forming the projection surface SC.

After the processing in step S34, step S36, or step S37 ends, the projector 8 ends a series of processing shown in FIG. 20 and executes the processing in step S4 in FIG. 18.

Figure 21:
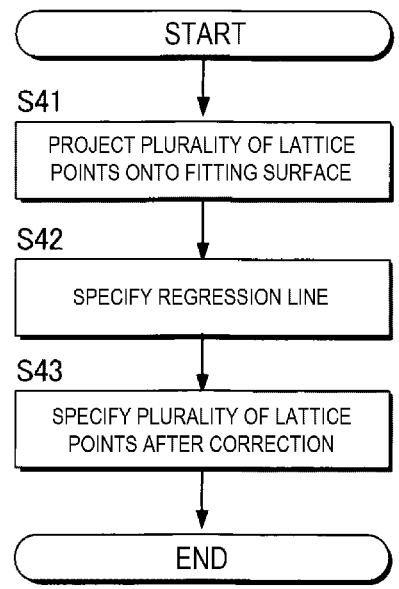
FIG. 21 is a flowchart showing the filtering processing.

Referring back to FIG. 18, in step S4, the specifying section 884 executes the filtering processing shown in FIG. 21.

FIG. 21 is a flowchart showing the filter processing. In step S41, the specifying section 884 projects, in the xyz space, the plurality of lattice points GPb onto the fitting surface FS. Subsequently, in step S42, the specifying section 884 specifies, with respect to the plurality of lattice points GPb after the projection, using the method of least squares, the regression lines VL with respect to the lattice points GPb in columns and the regression lines HL with respect to the lattice point GPb in rows. In step S43, the specifying section 884 specifies intersections of the regression lines VL and the regression lines HL as the plurality of lattice points GPb after the correction. After the processing in step S43 ends, the projector 8 ends a series of processing shown in FIG. 21 and executes the processing in step S5 in FIG. 18.

Referring back to FIG. 18, in step S5, the generating section 886 generates the correction data CD based on the positions of the respective plurality of lattice points GPb'. The generating section 886 saves the correction data CD in the storing section 83. After the processing in step S5 ends, the projector 8 ends a series of processing shown in FIG. 18.

Figure 22:
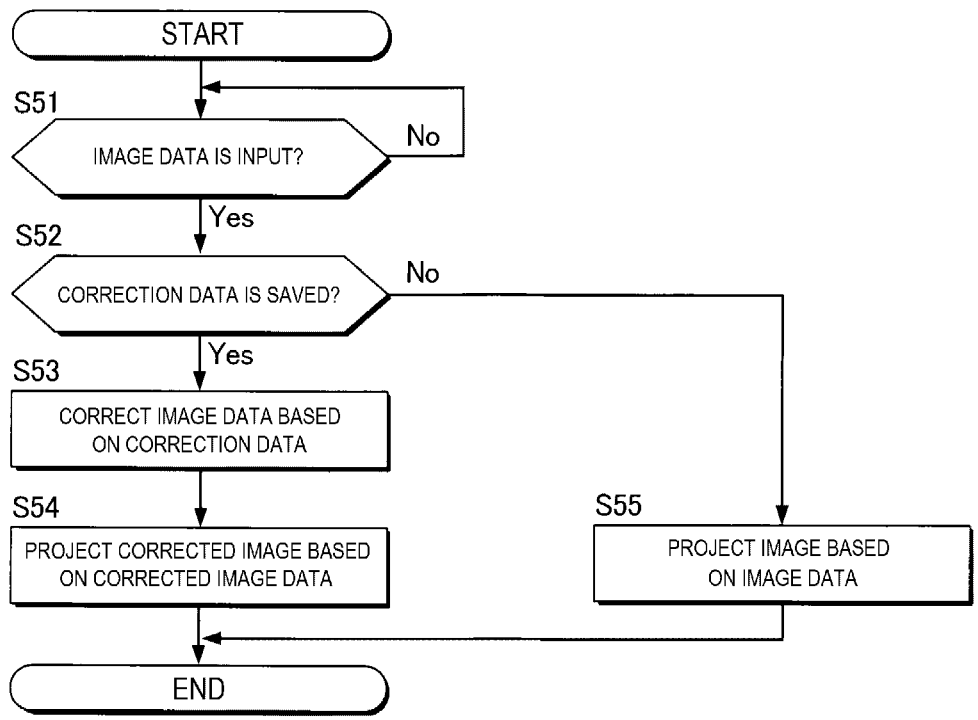
FIG. 22 is a flowchart showing image data projection processing.

FIG. 22 is a flowchart showing the image data projection processing. In step S51, the processing section 88 determines whether the image data GD is input from the image providing device 4. When a determination result in step S51 is negative, that is, when the image data GD is not input, the processing section 88 executes the processing in step S51 again after a fixed period elapses.

On the other hand, when the determination result in step S51 is affirmative, in step S52, the processing section 88 determines whether the correction data CD is stored in the storing section 83. When a determination result in step S52 is affirmative, in step S53, the correcting section 888 corrects the image data GD based on the correction data CD. In step S54, the projecting section 84 projects the corrected image CG based on the corrected image data CGD onto the projection surface SC.

On the other hand, when the determination result in step S52 is negative, in step S55, the projector 8 projects an image based on the image data GD onto the projection surface SC. After the processing in step S54 or step S55 ends, the projector 8 ends a series of processing shown in FIG. 22.

A. 4. Effects of the First Embodiment

As explained above, according to the first embodiment, the projector 8 projects the shape determination image G1 onto the projection surface SC to thereby display the shape determination projected image PG1 on the projection surface SC, acquires the shape determination imaging data GI1 obtained by capturing the shape determination projected image PG1, determines the type of the three-dimensional shape on the projection surface SC based on the shape determination imaging data GI1, projects the lattice image G2 showing the plurality of lattice points GPa onto the projection surface SC to thereby display the lattice projected image PG2 on the projection surface SC, acquires the lattice imaging data GI2 obtained by capturing the lattice projected image PG2, specifies the positions of the respective plurality of lattice points GPb on the projection surface SC based on the lattice imaging data GI2 and the type of the three-dimensional shape on the projection surface SC, generates, based on the positions of the respective plurality of lattice points GPb, the correction data CD for correcting distortion of an image projected onto the projection surface SC, corrects, based on the correction data CD, the image data GD input to the projector 8, and projects the corrected image CG based on the corrected image data CGD obtained by correcting the image data GD onto the projection surface SC.

When the positions of the respective plurality of lattice points GPb are specified based on only the lattice imaging data GI2, since measurement errors are included, the corrected image CG projected onto the projection surface SC is sometimes distorted. On the other hand, in the first embodiment, the positions of the respective plurality of lattice points GPb can be accurately specified by the type of the three-dimensional shape on the projection surface SC determined based on the shape determination imaging data GI1. Therefore, it is possible to suppress distortion of the corrected image CG projected onto the projection surface SC.

The shape determination image G1 includes the stripe pattern. Since the line segment included in the stripe pattern is deformed according to the type of the three-dimensional shape on the projection surface SC, the projector 8 can accurately determine the three-dimensional shape on the projection surface SC by determining the type of the three-dimensional shape on the projection surface SC using the shape determination projected image PG1 including the stripe pattern.

In the processing for determining the type of the three-dimensional shape on the projection surface SC based on the shape determination imaging data GI1, the projector 8 determines the type of the three-dimensional shape on the projection surface SC out of the plurality of types including the first type and the second type. In the processing for specifying the positions of the respective plurality of lattice points GPb, the projector 8 specifies three-dimensional coordinates concerning the respective plurality of lattice points GPb based on the lattice imaging data GI2, applies the processing for correcting, based on the type of the three-dimensional shape on the projection surface SC, a plurality of three-dimensional coordinates specified concerning the respective plurality of lattice points GPb, and species the positions of the respective plurality of lattice points GPb on the projection surface SC. In the first embodiment, by determining the type of the three-dimensional shape on the projection surface SC, the projector 8 can accurately specify the positions of the respective plurality of lattice points GPb using the specified equation indicating the type of the shape. Therefore, the projector 8 can suppress distortion of the corrected image CG projected onto the projection surface SC.

The line segment is included in the shape determination image G1. The determining section 883 determines, based on the line segment included in the image indicated by the shape determination imaging data GI1, the type of the three-dimensional shape on the projection surface SC out of the plurality of types. Since characteristics different from one another according to the type of the three-dimensional shape appear in the line segment included in the shape determination projected image PG1, the projector 8 can accurately specify the type of the three-dimensional shape on the projection surface SC.

The plurality of types are the plane shape, the corner surface shape, the cylinder side surface shape, and the sine curve surface shape. If the projection surface SC is an artificial object, the type of the three-dimensional shape on the projection surface SC is considered to be sufficiently likely to correspond to any one of the four types described above. Therefore, there is a sufficient opportunity that the type of the three-dimensional shape on the projection surface SC can be determined. It is possible to sufficiently obtain an opportunity that distortion of the corrected image CG projected onto the projection surface SC can be suppressed.

B. Modifications

The aspects explained above can be variously modified. Specific aspects of modifications are illustrated below. Two or more aspects optionally selected out of the following illustrations can be combined as appropriate in a range in which the aspects do not contradict one another. In the modifications illustrated below, elements having action and functions equivalent to those in the embodiment are denoted by the reference numerals and signs used in the above explanation. Detailed explanation of the elements is omitted as appropriate.

B. 1. First Modification

In the first embodiment, it is explained that the shape determination image data GH1 is the image including the stripe pattern, which is the first form, or the rectangular image, which is the second form. However, not only this, but, for example, the shape determination image G1 may be divided into a plurality of regions UR. Each of the plurality of regions UR may be, for example, a region having four lattice points among a plurality of lattice points as vertexes. Therefore, the shape determination image G1 may be an image including the plurality of lattice points, that is, the lattice image G2. A determination method for a three-dimensional shape on the projection surface SC by the determining section 883 in the case in which the shape determination image G1 includes the plurality of lattice points is explained with reference to FIG. 23.

Figure 23:
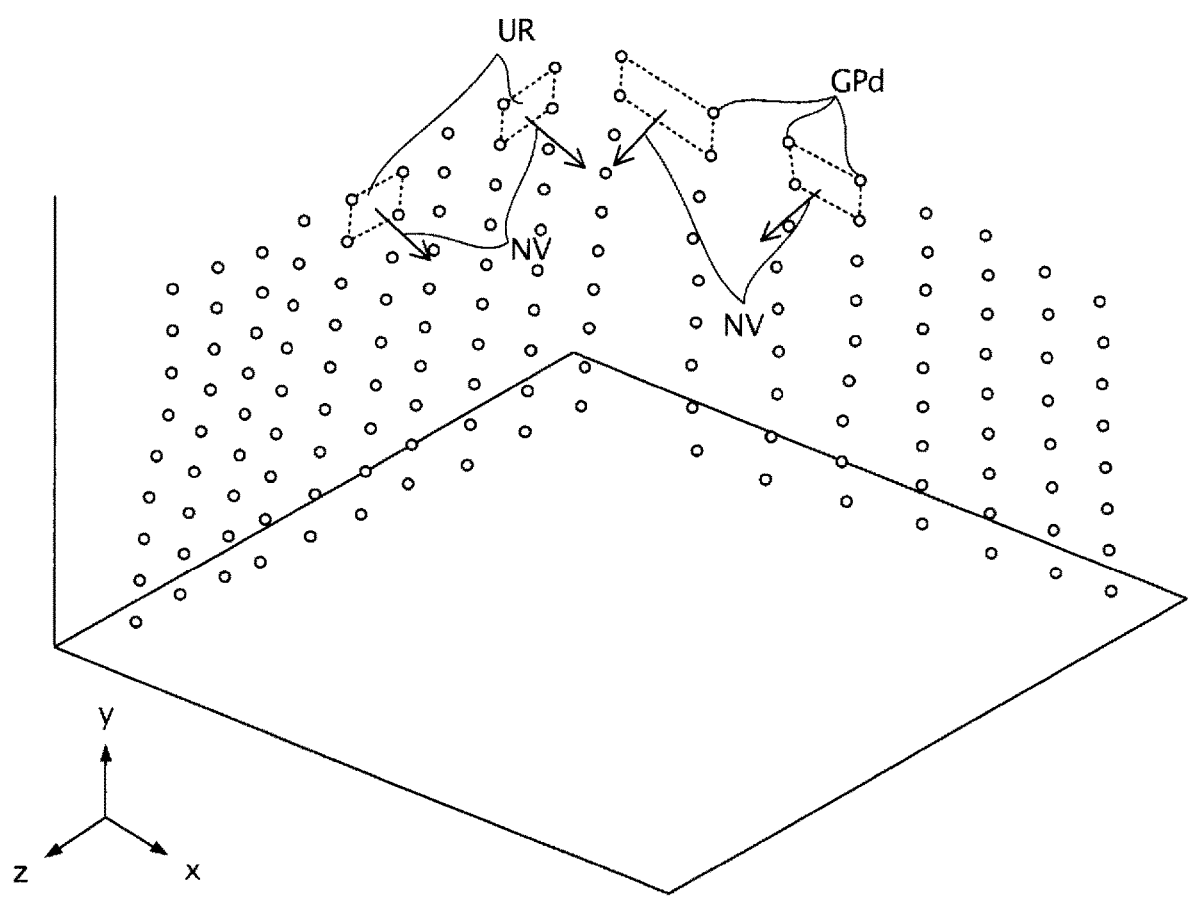
FIG. 23 is a diagram showing a determination method for a type of a three-dimensional shape on the projection surface in a first modification.

A determination method for the type of the three-dimensional shape on the projection surface SC in a first modification is shown in FIG. 23. The determining section 883 determines, based on the directions of normal vectors NV of the respective plurality of regions UR included in an image indicated by the shape determination imaging data GI1, the type of the three-dimensional shape on the projection surface SC out of the plurality of types concerning the three-dimensional shape. Each of the plurality of regions UR has four lattice points among a plurality of lattice points GPd as vertexes. In FIG. 23, in order to suppress complication of the drawing, only a part of the plurality of lattice points GPd is representatively denoted by signs. Only a part of the plurality of regions UR is representatively denoted by signs.

For example, when all differences among the normal vectors NV in the regions UR adjacent to one another are equal to or smaller than a predetermined threshold and fluctuation degrees in the directions of all the normal vectors NV are smaller than a predetermined threshold, the determining section 883 determines that the type of the three-dimensional shape on the projection surface SC is the plane shape. The fluctuation degrees in the directions of the normal vectors NV are, for example, standard deviations or variance values of angles indicating the directions of the normal vectors NV on the xz plane.

When the differences among the normal vectors NV in the regions UR adjacent to one another are equal to or larger than the predetermined threshold near a certain region UR and are equal to or smaller than the predetermined threshold in all the other regions UR, the determining section 883 determines that the type of the three-dimensional shape on the projection surface SC is the corner surface shape.

When the differences among the normal vectors NV in the regions UR adjacent to one another are equal to or smaller than the predetermined threshold and the directions of the normal vectors NV gradually change along the projection surface SC, the determining section 883 determines that the type of the three-dimensional shape on the projection surface SC is the cylinder surface shape. This is because, when the type of the three-dimensional shape on the projection surface SC is the cylinder surface shape, the directions of the normal vectors NV gradually change along the projection surface SC.

When the differences among the normal vectors NV in the regions UR adjacent to one another are equal to or smaller than the predetermined threshold, the directions of the normal vectors NV gradually change along the projection surface SC, and the change has periodicity, the determining section 883 determines that the three-dimensional shape on the projection surface SC is a sine curve surface shape.

According to the above explanation, the determining section 883 according to the first modification determines, based on the directions of the normal vectors NV in the respective plurality of regions UR included in the shape determination projected image PG1 indicated by the shape determination imaging data GI1, the type of the three-dimensional shape on the projection surface SC out of the plurality of types concerning the three-dimensional shape. Since characteristics different from one another according to the type of the three-dimensional shape appear in the directions of the normal vectors NV, the projector 8 can accurately determine the type of the three-dimensional shape on the projection surface SC.

B. 2. Other Modifications

The projector 8 explained above includes the imaging section 86 but may not include the imaging section 86. For example, the projection system 1 may include a camera on the outside of the projector 8. The projector 8 may acquire the shape determination imaging data GI1 and the lattice imaging data GI2.

In the aspects explained above, the determining section 883 determines the type of the three-dimensional shape on the projection surface SC out of a plurality of three-dimensional shapes, that is, the plane shape, the corner surface shape, the cylinder side surface shape, and the sine curve surface shape. However, not only this, but the determining section 883 may determine the type of the three-dimensional shape on the projection surface SC out of any two or any three of the plane shape, the corner surface shape, the cylinder side surface shape, and the sine curve surface shape. For example, the determining section 883 may determine the type of the three-dimensional shape on the projection surface SC out of a plurality of three-dimensional shapes, that is, the plane shape and the corner surface shape.

In the aspects explained above, the lattice image data GH2 including the plurality of lattice points is used as the image used for generating the correction data CD for correcting the distortion of the image projected onto the projection surface SC. However, the image used for generating the correction data CD for correcting the distortion of the image projected onto the projection surface SC is not limited to the image data in which the points are arranged in the lattice shape and may be image data including a dot pattern including a plurality of points.

In the projecting section 84 in the aspects explained above, the liquid crystal light valve is used as the light modulating device. However, the light modulating device is not limited to the liquid crystal light valve and can be changed as appropriate. For example, the light modulating device may be a component including three reflective liquid crystal panels. The light modulating device may be a component of a type including one liquid crystal panel, a type including three DMDs, a type including one digital mirror device, or the like. DMD is an abbreviation of Digital Micromirror Device. When only one liquid crystal panel or DMD is used as the light modulating device, members equivalent to a color separation optical system and a color combination optical system are unnecessary. Besides the liquid crystal panel and the DMD, a component capable of modulating light emitted by the light source can be adopted as the light modulating device.

In the aspects explained above, all or a part of the elements realized by the processing section 88 executing programs may be realized as hardware by an electronic circuit such as an FPGA or an ASIC or may be realized by cooperation of the software and the hardware. FPGA is an abbreviation of Field Programmable Gate Array. ASIC is an abbreviation of Application Specific IC. The present disclosure is also specified as a control method for the projector 8 according to the aspects explained above.

What is claimed is:

1. A control method for a projector comprising:
   projecting a first image onto a projection surface to thereby display, at a first time, a first projected image on the projection surface;
   acquiring first imaging data obtained by capturing, at a second time, the first projected image;
   determining, based on the first imaging data, a type of a three-dimensional shape of the projection surface;
   projecting a second image including a plurality of points onto the projection surface to thereby display, at a third time different from the first time, a second projected image on the projection surface, the second projected image being displayed on the projection surface when the first projected image is not displayed on the projection surface;
   acquiring second imaging data obtained by capturing, at a fourth time different from the second time, the second projected image on the projection surface when the first projected image is not displayed on the projection surface;
   specifying, based on the second imaging data and the type of the three-dimensional shape on the projection surface, positions of the respective plurality of points on the projection surface;
   generating, based on the positions of the respective plurality of points, correction data for correcting distortion of an image projected onto the projection surface;
   correcting, based on the correction data, image data input to the projector; and
   projecting, onto the projection surface, a corrected image based on corrected image data obtained by correcting the image data,
   wherein:
   when the first projected image is displayed on the projection surface, the second projected image is not displayed on the projection surface,
   when the first imaging data is obtained by capturing the first projected image, the second projected image is not displayed on the projection surface,
   the first image includes a line segment, and
   the first imaging data includes information of the line segment,
   the control method further comprising:
   determining the type of the three-dimensional shape includes:
      determining a shape of the line segment in the first imaging data,
      concluding that the three-dimensional shape is a plane shape when it is determined that the line segment is a straight line,
      concluding that the three-dimensional shape is a corner surface shape when it is determined that the line segment is polygonal line,
      concluding that the three-dimensional shape is a cylinder side surface shape when it is determined that the line segment is an arc of a circle or an ellipse, and
      concluding that the three-dimensional shape is a sine curve surface shape when it is determined that the line segment is sine curve.

2. The control method for the projector according to claim 1, wherein the first image includes a stripe pattern.

3. The control method for the projector according to claim 1, wherein
   in processing for determining the type of the three-dimensional shape on the projection surface based on the first imaging data, the type of the three-dimensional shape on the projection surface is determined out of a plurality of types concerning the three-dimensional shape including a first type and a second type, and
   in processing for specifying positions of the respective plurality of points,
   three-dimensional coordinates are specified concerning the respective plurality of points based on the second imaging data, and
   processing for correcting, based on the type of the three-dimensional shape on the projection surface, a plurality of three-dimensional coordinates specified concerning the respective plurality of points is applied and positions of the respective plurality of points on the projection surface are specified.

4. The control method for the projector according to claim 3, wherein
   a line segment is included in the first image, and
   the type of the three-dimensional shape on the projection surface is determined out of the plurality of types based on a line segment included in the first projected image indicated by the first imaging data.

5. The control method for the projector according to claim 3, wherein
   the first image is divided into a plurality of regions, and
   the type of the three-dimensional shape on the projection surface is determined out of the plurality of types based on directions of normal vectors in a respective plurality of regions included in the first projected image indicated by the first imaging data.

6. The control method for the projector according to claim 3, wherein the plurality of types are a plane shape, a shape formed by a first plane and a second plane crossing the first plane, a shape of a side surface of a cylinder, a shape of a side surface of an elliptical cylinder, and a shape formed by projecting the projection surface on a sine curve in a plan view from a direction perpendicular to a placement surface of the projector.

7. A projector comprising:
a projection lens configured to project an image onto a projection surface; and
a processor programmed to:
   acquire imaging data obtained by capturing the image projected onto the projection surface;
   determine a type of a three-dimensional shape of the projection surface;
   specify positions of a respective plurality of points projected onto the projection surface;
   generate correction data for correcting distortion of the image projected onto the projection surface; and
   correct image data input to the projector, wherein
the projection lens projects a first image onto the projection surface to thereby display, at a first time, a first projected image on the projection surface,
the processor acquires first imaging data obtained by capturing, at a second time, the first projected image,
the processor determines, based on the first imaging data, a type of the three-dimensional shape of the projection surface,
the projection lens projects a second image indicating a plurality of points onto the projection surface to thereby display, at a third time different from the first time, a second projected image on the projection surface, the second projected image being displayed on the projection surface when the first projected image is not displayed on the projection surface;
the processor acquires second imaging data obtained by capturing, at a fourth time different from the second time, the second projected image on the projection surface when the first projected image is not displayed on the projection surface,
the processor specifies, based on the second imaging data and the type of the three-dimensional shape on the projection surface, positions of the respective plurality of points on the projection surface,
the processor generates the correction data based on the positions of the respective plurality of points,
the processor corrects the image data based on the correction data, and
the projection lens projects, onto the projection surface, a corrected image based on corrected image data obtained by correcting the image data,
wherein:
when the first projected image is displayed on the projection surface, the second projected image is not displayed on the projection surface, and
when the first imaging data is obtained by capturing the first projected image, the second projected image is not displayed on the projection surface,
the first image includes a line segment,
the first imaging data includes information of the line segment, and
the processor is further programmed to:
   determine a shape of the line segment in the first imaging data,
   conclude that the three-dimensional shape is a plane shape when it is determined that the line segment is a straight line,
   conclude that the three-dimensional shape is a corner surface shape when it is determined that the line segment is polygonal line,
   conclude that the three-dimensional shape is a cylinder side surface shape when it is determined that the line segment is an arc of a circle or an ellipse, and
   conclude that the three-dimensional shape is a sine curve surface shape when it is determined that the line segment is sine curve.

8. The control method for the projector according to claim 1, wherein the captured second projected image does not contain the first imaging data, and the captured first projected image does not contain the second imaging data.

9. The projector to claim 7, wherein the captured second projected image does not contain the first imaging data, and the captured first projected image does not contain the second imaging data.

* * * * *